US006360201B1

(12) United States Patent
Lewis et al.

(10) Patent No.: US 6,360,201 B1
(45) Date of Patent: Mar. 19, 2002

(54) METHOD AND APPARATUS FOR ACTIVATING AND DEACTIVATING AUXILIARY TOPIC LIBRARIES IN A SPEECH DICTATION SYSTEM

(75) Inventors: James R. Lewis, Delray Beach, FL (US); Kerry A. Ortega, Raleigh, NC (US); Ronald Vanbuskirk, Indiantown; Huifang Wang, Boynton Beach, both of FL (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/328,087

(22) Filed: Jun. 8, 1999

(51) Int. Cl.[7] .............................................. G10L 15/04
(52) U.S. Cl. ...................... 704/251; 704/257
(58) Field of Search ........................... 704/10, 231, 236, 704/237, 239, 243, 244, 251, 252, 253, 257

(56) References Cited

U.S. PATENT DOCUMENTS

| 5,428,707 A | * | 6/1995 | Gould et al. ................ 704/231 |
| 5,524,169 A | * | 6/1996 | Cohen et al. ................ 704/231 |
| 5,758,322 A | * | 5/1998 | Rongley ..................... 704/275 |
| 5,787,394 A | * | 7/1998 | Bahl et al. .................. 704/238 |
| 5,895,448 A | * | 4/1999 | Vysotsky et al. ........... 704/251 |
| 6,125,341 A | * | 9/2000 | Raud et al. ..................... 704/8 |

* cited by examiner

Primary Examiner—Tãlivaldis Ivars Šmits
Assistant Examiner—Abul K. Azad
(74) Attorney, Agent, or Firm—Akerman Senterfitt

(57) ABSTRACT

A dictation system (100) performs a method of dictating speech which automatically activates (502) and deactivates (306, 408, 510) auxiliary topic libraries based on the input speech. After receiving (206) input speech, the method searches (208, 214) a general library and topic libraries that are currently active, if any. The method also searches (220, 226) all or portions of inactive topic libraries. If the spoken word is recognized in a particular inactive topic library, the method automatically activates (502) that topic library. In a preferred embodiment, the method maintains an adjustable "score" for each active topic library. An active library's score is increased (402) each time a word is recognized in the library, and decreased (302, 404, 506) when a word is recognized in another library. If the score falls below a certain threshold, the active topic library is automatically deactivated (306, 408, 510).

33 Claims, 10 Drawing Sheets

METHOD AND APPARATUS FOR ACTIVATING AND DEACTIVATING AUXILIARY TOPIC LIBRARIES IN A SPEECH DICTATION SYSTEM

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

The field of the invention is speech dictation. More particularly, the invention relates to software-implemented speech dictation using general libraries and auxiliary topic libraries.

Speech dictation methods implemented through software typically search for matches to spoken words in a "general library" database associated with the software. The general library includes words that are commonly used in the language of interest, but may not include words that are germane to specialized topics. For example, a general library may not contain a full range of words relating to topics such as specialized technical fields, medical fields, activities or hobbies having distinctive vocabularies, or ethnic jargon. In the area of cooking, for example, a general library may not include words or phrases such as "au poivre" or "al dente." Because the speed of a dictation system is proportional to the size of the word database that must be searched, it is impractical for a general library to include every word that may be spoken.

Because general libraries do not contain all specialized words, they may not recognize a specialized word, or may identify the word incorrectly. Prior art systems have overcome some of the misrecognition or non-recognition problems associated with the limitations of a general library by enabling the dictation system user to activate "auxiliary topic libraries." As the name implies, these libraries consist of separate databases that are searched independently from the general library. In addition, each library includes words commonly associated with a particular topic. For example, some topics might be: electrical engineering, astronomy, cooking, art, or internal medicine.

As stated previously, the speed of the dictation process is proportional to the number of words the system must search in order to match a spoken word with a word in the databases being searched. Because topic libraries often include words that are not commonly used, it is inefficient for a dictation system always to search all available topic libraries. Therefore, prior art systems have provided users the ability to activate and deactivate available topic libraries. When a user plans to speak on a topic such as cooking, for example, the user would activate the auxiliary topic library relating to cooking. When the user no longer plans to speak on the topic, the user could deactivate the library in order to speed the dictation process.

Prior art systems require the user to take action to activate or deactivate an auxiliary topic library. If the user forgets to activate a particular topic library, the system may have low recognition accuracy. If the user forgets to deactivate a particular topic library, the dictation system may be inefficient, as it must search through more words than necessary in order to determine a match.

What is needed is a method and apparatus for automatically activating and deactivating auxiliary topic libraries. What is further needed is a method for activating and deactivating auxiliary topic libraries that is user-friendly, and results in efficient and accurate speech recognition and dictation.

SUMMARY OF THE INVENTION

A method for dictating speech compares a spoken word of input speech with words in one or more active libraries. If the spoken word is recognized as being a word from an active library, the spoken word is dictated to be that word, and the method processes another word. If the spoken word is not recognized as being a word from an active library, the method compares the spoken word to words within one or more inactive libraries. If the spoken word is recognized as being a word from an inactive library, the method automatically activates the corresponding inactive library, and dictates the spoken word to be the word from the previously-inactive library. The method also automatically deactivates an active library if a sufficient number of spoken words have occurred that have not been recognized in the active library.

The method can be executed by a machine that executes a plurality of code sections of a computer program that is stored on a machine readable storage.

An apparatus for dictating speech includes a microphone, an analog to digital converter, a processor, and a memory device. The microphone receives the input speech, and the analog to digital converter converts the input speech to digital speech samples. The processor receives a block of the digital speech samples that represents a spoken word, and compares the spoken word to words within the active and, if necessary, the inactive libraries. Based on that comparison, the processor may automatically activate an inactive library. The processor also dictates the spoken word. The memory device stores the active and inactive libraries.

DESCRIPTION OF THE PREFERRED EMBODIMENT

Figure 1:
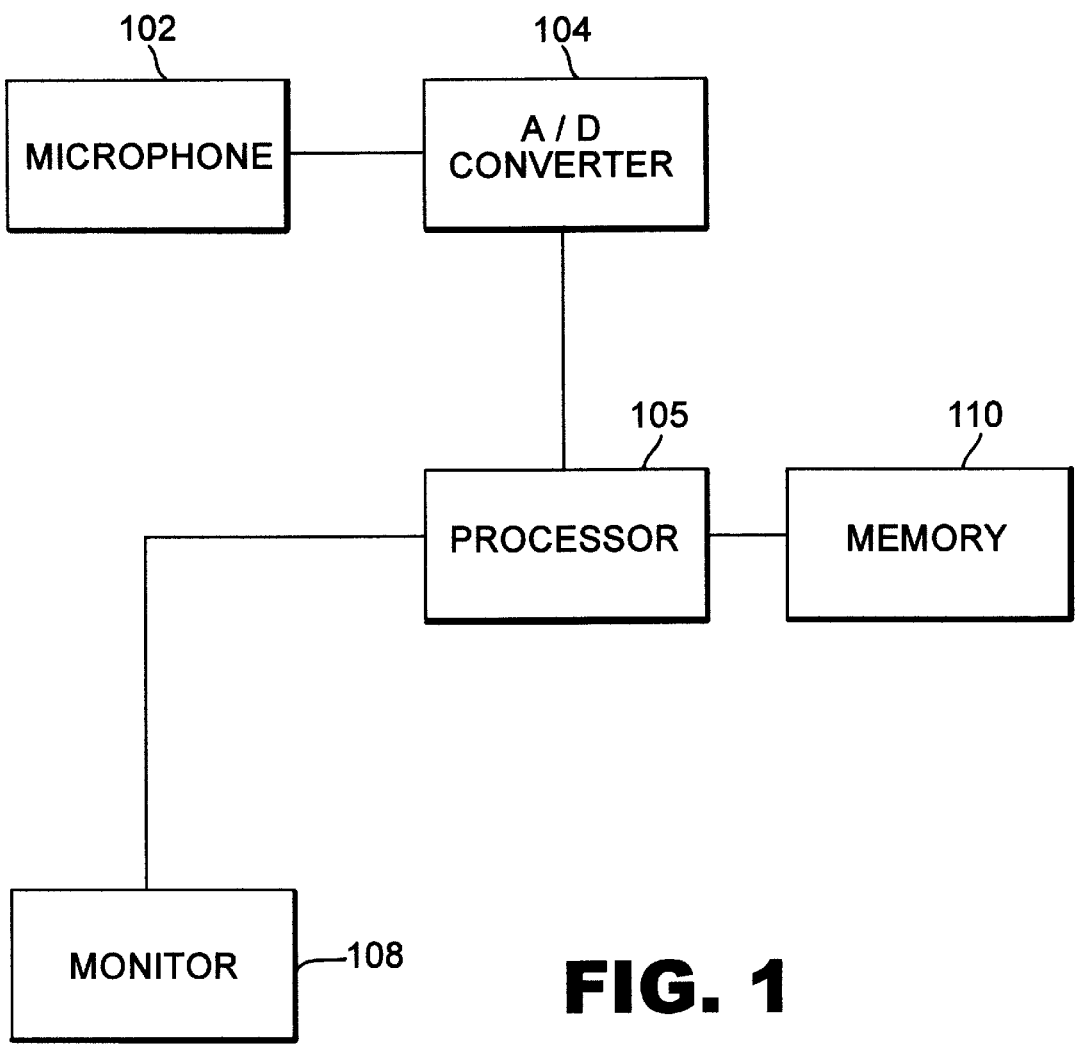
FIG. 1 illustrates a simplified block diagram of a dictation system in accordance with a preferred embodiment of the present invention.

FIG. 1 illustrates a simplified block diagram of a dictation system 100 in accordance with a preferred embodiment of the present invention. Dictation system 100 includes microphone 102, analog-to-digital (A/D) converter 104, processor 106, monitor 108, and memory 110. Dictation system 100 could be implemented, for example, in a personal computer upon which dictation system software and databases have been loaded. In accordance with a preferred embodiment of the present invention, the dictation system software executes the method described below.

After a user has invoked the dictation system software and entered a dictation mode, the user's spoken speech would be sensed by microphone 102, and converted into an electrical signal. The electrical signal would then be sampled and converted, by A/D converter 104, from an analog form to a digital form.

Processor 106 would then use speech recognition techniques to identify the spoken words. Typically, processor 106 would analyze "blocks" of digitized speech, each of which consists of a number of digital speech samples. A spoken word may be represented by one or more of such blocks.

Processor 106 compares the digitized spoken word with words contained within one or more libraries. As will be described below, spoken words are first compared to words within libraries that are currently "active," although other "inactive" libraries also may be accessible to processor 106. Processor 106 determines, during the comparison process, which word within a stored library most closely "matches" the spoken word. Many techniques for comparing and matching spoken words with stored library words are currently well known to those of skill in the art.

Once processor 106 has determined that the spoken word matches a word within one of the libraries, processor 106 stores the matching library word in memory 110. In addition, processor 106 can cause the matching library word to be displayed, in text format, on monitor 108.

In a preferred embodiment, active and inactive libraries are also stored in memory 110. Memory 110 could be any type of memory device capable of storing electronic information. For example, memory 110 could be a hard drive, random access memory (RAM), read-only memory (ROM), portable magnetic storage medium (e.g., floppy disk or tape), or portable optical storage medium (e.g., compact disk). In some embodiments, active libraries may be stored in RAM, while inactive libraries may be stored elsewhere. This would increase the speed of the dictation process by providing fast access to the active libraries.

The dictation process can be conducted in real-time or offline. In an offline process, the dictation system could store digital speech samples within memory 110, and translate the speech to a text format at a later time. Either way, dictation system 100 dictates speech using a method which is described in detail in conjunction with FIGS. 2–10.

In alternate embodiments, the dictation system used to implement the method of FIGS. 2–10 could exist in various configurations. For example, the user interface (e.g., microphone and monitor), processing, and/or memory functions could be provided by devices that are remote from one another. In one embodiment, a user may speak into a microphone located at his workstation, but the processing and/or memory storage may be provided by a remote server. Numerous different hardware configurations exist which would enable the dictation method described below to be implemented.

Figure 2:
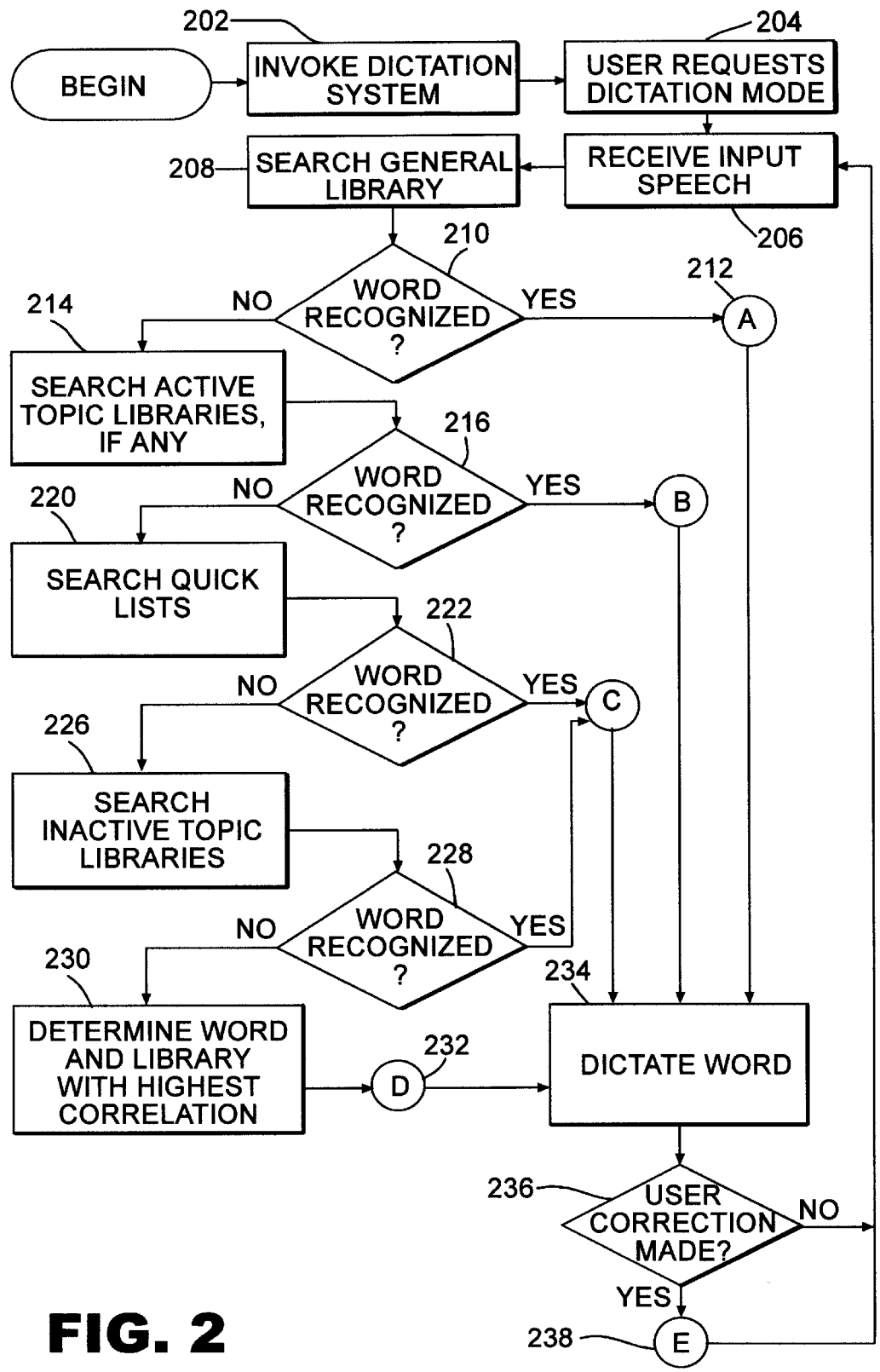
FIG. 2 illustrates a flowchart of a method for dictating speech using auxiliary topic libraries in accordance with a preferred embodiment of the present invention.

FIG. 2 illustrates a flowchart of a method for dictating speech using auxiliary topic libraries in accordance with a preferred embodiment of the present invention. The method is desirably implemented using software stored on or accessible to a speech dictation system (e.g., system 100, FIG. 1).

The method begins, in step 202, when a user invokes the speech dictation system. Invoking the dictation system could be done, for example, by the user opening the software application that performs the dictation. In a preferred embodiment, the user would then be able to select from one of several modes of operation. As is described herein, the user may select from a "dictation" mode or from a "setup" mode, although other modes could also be available, either controlled manually by the user or automatically by the system, as is done in current "modeless" systems such as IBM Corporation's ViaVoice '98. The dictation mode enables the user, in conjunction with the software, to create a dictated document by speaking into a microphone. The dictation mode is described in conjunction with FIGS. 2–9. The setup mode enables the user to specify various features and parameters that the software will use during the dictation process. The setup mode is described in conjunction with FIG. 10. In step 204, dictation is invoked when the user requests the dictation mode.

Dictation begins, in step 206, by receiving input speech from the user, where the speech is represented by digital speech samples. The input speech could be received in real time as the user is speaking, or could be retrieved from storage, having been stored previously. As part of the initial processing, the digital speech samples are parsed into words or phrases. Each spoken word or phrase is then compared to words within various libraries in a preferred embodiment. In a preferred embodiment, the comparison is performed by searching the various libraries in a sequential manner, as shown in steps 208–228. In a preferred embodiment, the libraries searched include a general library, any topic libraries that are currently active, topic "quick lists," and inactive topic libraries. As is explained below, not all of the libraries listed above would be searched for each spoken word.

In step 208, the general library is searched, and a determination is made, in step 210, whether the spoken word sufficiently matches any word within the general library to indicate that the spoken word has been recognized. The general library, as explained previously, includes words that are commonly used in the language of interest. Typically, the general library is always considered to be "active," and thus is not affected by the automatic activation and deactivation features of the method of the preferred embodiment.

Essentially, when the general library is searched, the spoken word is correlated with the library words, and if the correlation with any one or more words is higher than a particular "recognition threshold", a match is determined. The process for determining whether a word is recognized is described in more detail in conjunction with FIG. 8, below.

If the spoken word is recognized, then the method implements a process, "A", in step 212 in a preferred embodiment.

That process, which relates to the automatic activation and deactivation of topic libraries, will be described in more detail in conjunction with FIG. 3, below.

If the spoken word is not recognized in step 210, then the method, in step 214, searches those topic libraries, if any, that are currently active. In a preferred embodiment, the method keeps track of a topic library's activation status, for example, by associating an "activation status" bit to the library. When the activation status bit has a value of 0, the library could be considered inactive. When the activation status bit has a value of 1, then the library could be considered active. Therefore, when the method deactivates a particular topic library, the method would change the value of the activation status bit to 0. When the method activates a particular topic library, the method would change the value of the activation status bit to 1.

A determination is made, in step 216, whether the spoken word sufficiently matches any word within the active topic libraries to indicate that the spoken word has been recognized. As with the general library search described above, the spoken word is correlated with the topic libraries' words, and if the correlation with any one or more words is higher than a particular recognition threshold, a match is determined (as described in conjunction with FIG. 8).

If the spoken word is recognized, then the method implements a process, "B", in step 218 in a preferred embodiment. That process, which relates to the automatic activation and deactivation of topic libraries, will be described in more detail in conjunction with FIG. 4, below.

If the spoken word is not recognized in step 216, then the method, in step 220, searches one or more "quick lists" in a preferred embodiment. A quick list is a list of the most common words associated with a particular topic, but the list does not include all words in a full topic library. Desirably, the words within each quick list are words that provide strong evidence that the user is dictating in the associated topic area. In a preferred embodiment, each quick list is associated with a complete topic library.

If a determination is made, in step 222, that a spoken word is recognized as a word included in a quick list, then the method implements a process, "C", in step 224 in a preferred embodiment. That process, which is described in detail in conjunction with FIG. 5, activates the complete topic library associated with the quick list in which the word was found. The process also performs other functions related to the automatic activation and deactivation of topic lists.

In a preferred embodiment, the quick lists are searched only if a match is not found in an active list (step 216). In an alternate embodiment, the quick lists could always be considered to be active, and thus they would be searched along with the active lists. In another alternate embodiment, the quick list search is not performed. Instead, the method flow proceeds from a search of active libraries to inactive libraries. The advantage of the quick list search, however, is that it could result in a more rapid determination of whether a word is included in an inactive topic library than with a full search of the inactive topic libraries.

If the spoken word is not recognized in step 222, then the method, in step 226, searches one or more inactive topic libraries in a preferred embodiment. The inactive topic libraries could include all topic libraries accessible by the method, or some subset thereof. In a preferred embodiment, the user would have had an opportunity, during a setup mode, to identify those topic libraries that the user could foresee needing. In addition, the user could assign priority ranking information to the topic libraries that indicate the order in which the topic libraries should be searched. These priority rankings could be applied to topic quick lists as well. These setup features are described in more detail in conjunction with FIG. 10, below.

In any event, a determination is made, in step 228, whether the spoken word sufficiently matches any word within an inactive topic library to indicate that the spoken word has been recognized. As with the other searches described above, the spoken word is correlated with the topic library words, and if the correlation with one or more words is higher than a particular recognition threshold, a match is determined (as described in conjunction with FIG. 8).

If a determination is made, in step 228, that a spoken word is recognized as a word included in an inactive library, then the method implements the process C, in step 224 in a preferred embodiment. That process, which is described in detail in conjunction with FIG. 5, activates the topic library in which the word was found. The process also performs other functions related to the automatic activation and deactivation of topic lists.

If the spoken word is not recognized in step 228, then the method, in step 230, determines the library word which had the highest correlation with the spoken word. As is described in more detail in conjunction with FIG. 8, each time a library or quick list is searched (e.g., in steps 208, 214, 220, and 226), the word within the library which has the highest correlation to the spoken word within that library is identified, and the word and correlation are stored, even though the correlation may fall below a recognition threshold. Those stored words and the associated correlations are accessed by step 230 in order to determine which of the stored correlations is the highest. In an alternate embodiment, a "highest overall correlation" parameter could be maintained by the system. During the sequential searching of the general, active topic, and inactive topic libraries, the parameter could be updated to reflect the highest overall correlation from all of the library searches. The identity of the library and the matching word would also desirably be stored.

Once the method determines the word with the highest correlation (and the library containing that word), then the method implements the process, "D" in step 232, in a preferred embodiment. That process, which is described in detail in conjunction with FIG. 6, performs functions related to the automatic activation and deactivation of topic lists.

Regardless of which library the spoken word was recognized in, the word is dictated in step 234. Dictation essentially consists of storing and/or displaying a textual representation of the library word in the sequence of the document being dictated.

The user of the dictation system has an opportunity to edit or correct the dictated words. These corrections could be made in real time as the user watches the dictation being displayed on the monitor, or could be made offline as the user views the document after dictation is completed. A determination is made, in step 236, whether the user has made a correction to a dictated word. If so, then the method implements the process, "EEN", in step 238 in a preferred embodiment. That process, which is described in detail in conjunction with FIG. 7, performs functions related to the automatic activation and deactivation of topic lists.

If the user has not made any correction, then the method returns to step 206 and the procedure iterates as shown in FIG. 2. In alternate embodiments, several of the steps shown in FIG. 2 could be performed simultaneously through various parallel processing techniques. For example, receipt of input speech (step 206) could be performed simultaneously with any or all of the searching steps (steps 208, 214, 220, or 226), recognition steps (steps 210, 216, 222, or 228), dictation step 234, or almost any other steps. In addition, the various libraries and quick lists could be searched in parallel, rather than in sequence. An alternate embodiment showing one parallel processing embodiment is described in conjunction with FIG. 9, below.

FIG. 2 describes the general flow of the library searches in accordance with a preferred embodiment. As discussed previously, one major advantage to the method and apparatus of the present invention is that it enables topic libraries to be activated and deactivated automatically. The automatic activation and deactivation of topic libraries is performed, in a preferred embodiment, within the context of processes A, B, C, D, and E (steps 212, 218, 224, 232, and 238, respectively) of FIG. 2. Each of these processes is described below in conjunction with FIGS. 3–7.

Automatic activation of a topic library is performed after one or more words are recognized in a quick list or an inactive topic library. Automatic deactivation is performed after an insufficient number of spoken words have been recognized in an active topic library. Alternatively, automatic deactivation could occur when a pre-defined period of time has elapsed without finding a spoken word within an active topic library.

Numerous ways of determining the activity level relating to a particular topic library, and activating or deactivating the library, would be obvious to one of skill in the art based on the description herein. In a preferred embodiment, the activity level is monitored by associating a "score" with each active topic library, and increasing or decreasing that score based on how many spoken words are recognized, or not, within each active topic library. When the score falls below a certain threshold score, called "Topic-Off" herein, then the topic library is automatically deactivated. The Topic-Off threshold could be a value of 0, for example, or could be some larger or smaller number. When a topic library is newly activated, then it is given a score, called "Topic-On" herein, that is at least equal to, but desirably higher than Topic-Off. The Topic-On threshold could be a value of 50, for example, or could be some larger or smaller number.

In a preferred embodiment, topic library scores are integer numbers, although they could alternatively be represented using decimal or other numbers or symbols. These scores are stored in memory during dictation. The scores could be retained from one dictation session to another, or could be re-set at the beginning of each dictation session.

Linguists broadly divide words into two classes: the closed-class (or "function") words; and the open-class (or "content") words. Function words are words that primarily perform a syntactic function (e.g., prepositions and articles). Content words, on the other hand, include words such as nouns, verbs, adjectives, and adverbs. Topic libraries consist primarily of content words, where a general library would consist of both function and content words. The function words occur frequently in most speech, but they do not necessarily reflect on whether a particular topic library is being underutilized. Therefore, in a preferred embodiment, topic library scores are not adjusted when a function word is recognized. In an alternate embodiment, topic library scores could be adjusted, regardless of the class of word.

Adjustment of topic library scores and topic library activation/deactivation depends on what libraries the spoken words are being found within. If a spoken word is found in the general library, for example, topic library scores are adjusted in accordance with FIG. 3, which describes process A (step 212, FIG. 2). If a spoken word is found in an active library, topic library scores are adjusted in accordance with FIG. 4, which describes process B (step 218, FIG. 2). If a spoken word is found in a quick list or an inactive library, topic scores are adjusted in accordance with FIG. 5, which describes process C (step 224, FIG. 2). Each of these processes are now discussed.

Figure 3:
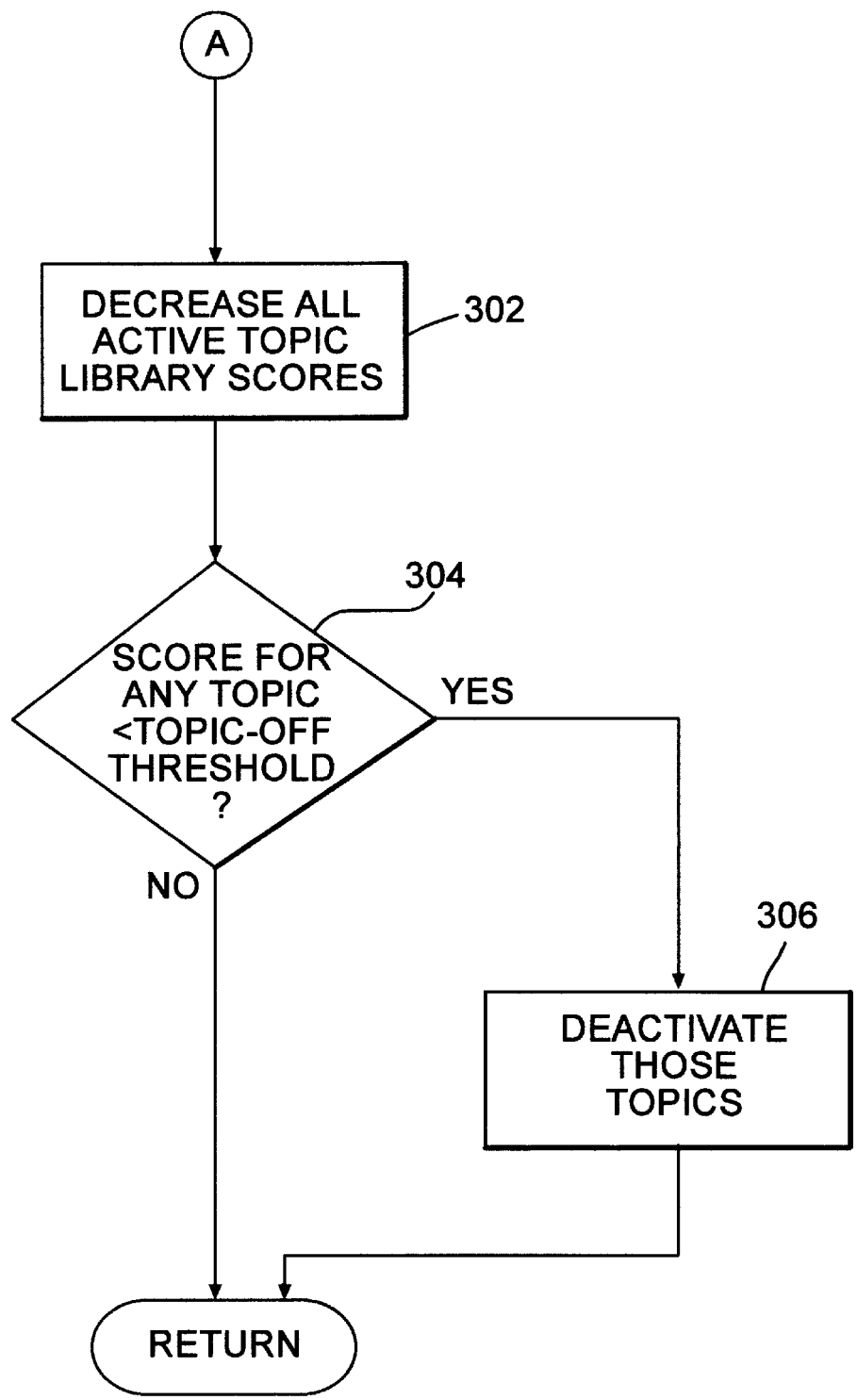
FIG. 3 illustrates a flowchart of a method for adjusting topic library scores and deactivating topic libraries after a word is recognized in a general library in accordance with a preferred embodiment of the present invention.

FIG. 3 illustrates a flowchart of a method for adjusting topic library scores and deactivating topic libraries after a word is recognized in a general library in accordance with a preferred embodiment of the present invention. The method is referred to as process A (step 212) in FIG. 2.

When a spoken word was recognized in the general library, then due to the program flow in FIG. 2, it is obvious that the word will not later be recognized in a topic library. Because the topic library scores reflect the frequency of use of each topic library, the topic library scores are decreased when a word is found in the general library.

Accordingly, the method begins, in step 302, by decreasing topic library scores for all currently active topic libraries. In a preferred embodiment, each active topic library score is decreased by 1. In other embodiments, the score could be decreased by more (or less) than 1, depending on other factors.

In step 304, a determination is made whether the score for any currently active topic library is less than the Topic-Off threshold. If so, then each topic library whose score has fallen below the Topic-Off threshold is automatically deactivated in step 306. After deactivation, or if none of the active topic library scores have fallen below the Topic-Off threshold, then the method returns to the program being executed.

Figure 4:
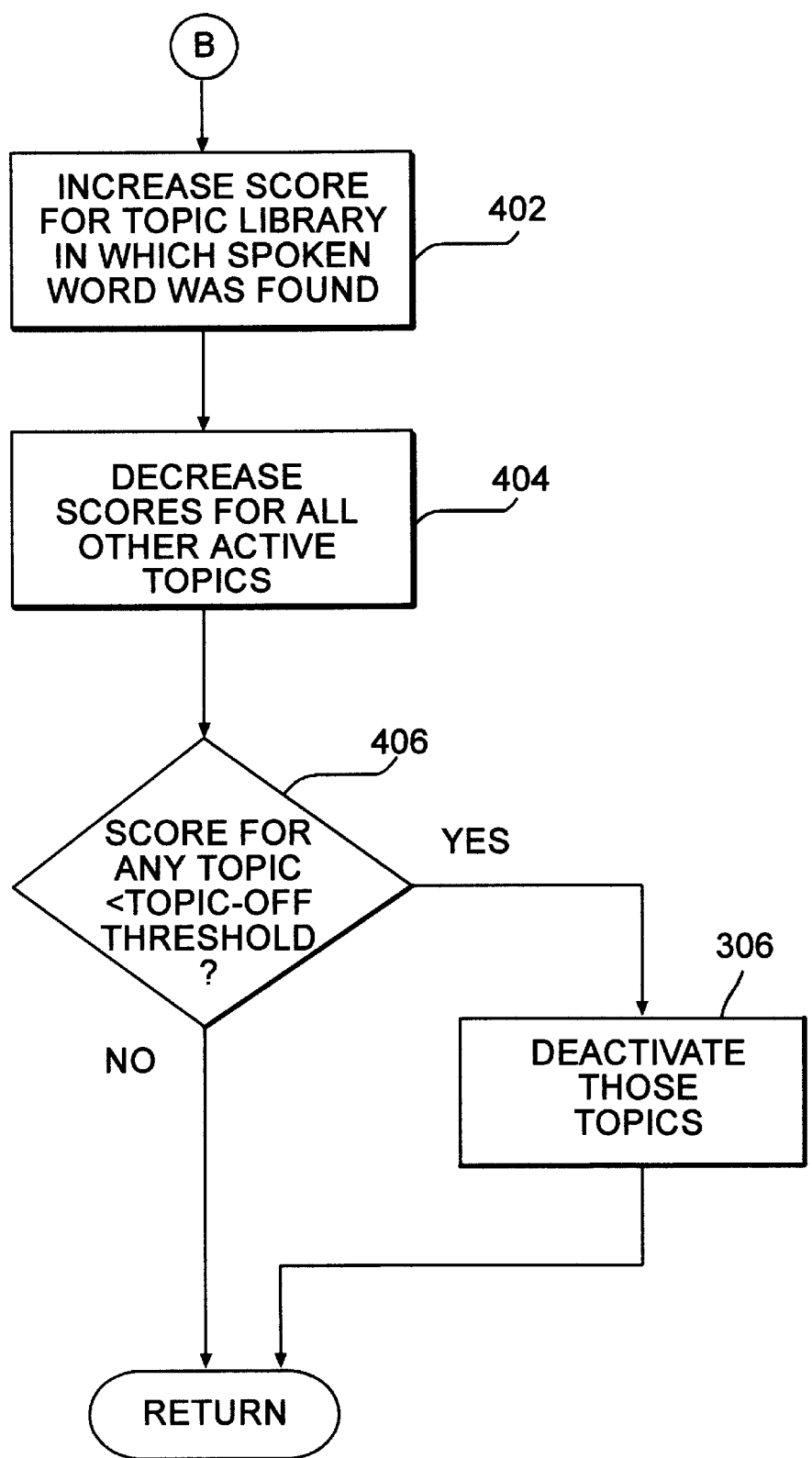
FIG. 4 illustrates a flowchart of a method for adjusting topic library scores and deactivating topic libraries after a word is recognized in an active topic library in accordance with a preferred embodiment of the present invention.

FIG. 4 illustrates a flowchart of a method for adjusting topic library scores and deactivating topic libraries after a word is recognized in an active topic library in accordance with a preferred embodiment of the present invention. The method is referred to as process B (step 218) in FIG. 2.

When a spoken word was recognized in an active library, then due to the program flow in FIG. 2, it is obvious that the word will not later be recognized in a quick list or inactive topic library. Because the topic library scores reflect the frequency of use of each topic library, the score for the active topic library in which the word was found should be increased, while the scores for other active topic libraries should be decreased.

Accordingly, the method begins, in step 402, by increasing the score corresponding to the active topic library in which the spoken word was found. In a preferred embodiment, the active topic library score is increased by 1. In other embodiments, the score could be increased by more (or less) than 1, depending on other factors.

In step 404, topic library scores for all other currently active topic libraries are decreased in a manner similar to step 302 (FIG. 3). In step 406, a determination is made whether the score for any currently active topic library is less than the Topic-Off threshold. If so, then each topic library whose score has fallen below the Topic-Off threshold is automatically deactivated in step 408.

After deactivation, or if none of the active topic library scores have fallen below the Topic-Off threshold, then the method returns to the program being executed.

Figure 5:
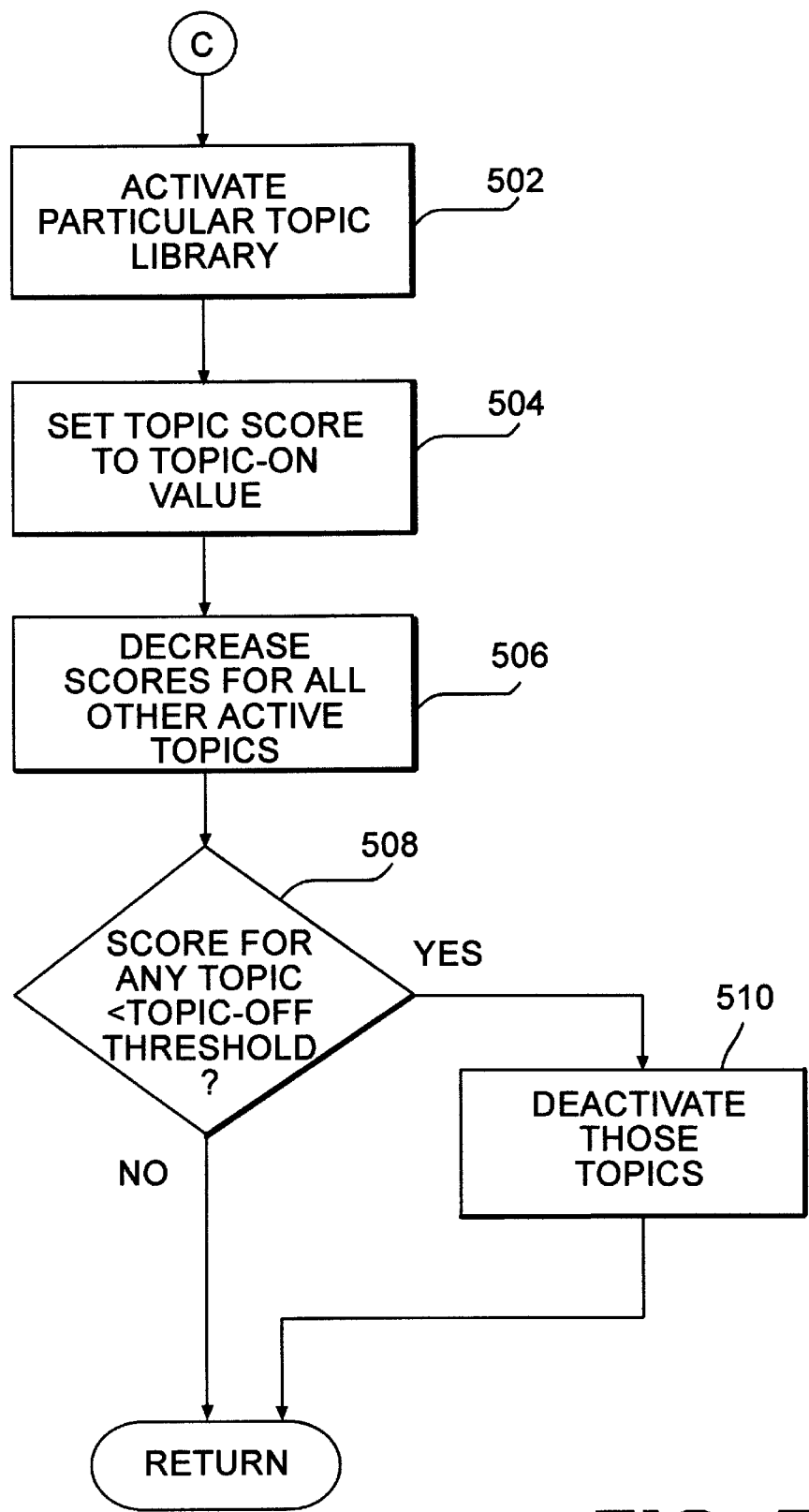
FIG. 5 illustrates a flowchart of a method for adjusting topic library scores, activating a topic library, and deactivating topic libraries after a word is recognized in a topic quick list or inactive topic library in accordance with a preferred embodiment of the present invention.

FIG. 5 illustrates a flowchart of a method for adjusting topic library scores, activating a topic library, and deactivating topic libraries after a word is recognized in a topic quick list or inactive topic library in accordance with a preferred embodiment of the present invention. The method is referred to as process C (step 224) in FIG. 2.

The method begins, in step 502, by activating a particular inactive topic library after a word was recognized in a quick list or the inactive topic library. As explained previously, quick lists are not intended to be full topic libraries. Instead, a quick list will contain a set of words from a particular topic library which represent the most commonly used topic library words. Thus, when a spoken word is recognized in a quick list, the quick list is not activated, but the topic library associated with the quick list is activated.

When a topic library is activated, its topic library score is set to a Topic-On value in step 504. As indicated previously, the Topic-On value is desirably greater than the Topic-Off value. This enables the activated library to remain active for a time, even though a number of intervening words may be recognized in the general library or in another active topic library.

In step 506, topic library scores for all other currently active topic libraries are decreased in a manner similar to step 302 (FIG. 3). In step 508, a determination is made whether the score for any currently active topic library is less than the Topic-Off threshold. If so, then each topic library whose score has After deactivation, or if none of the active topic library scores have fallen below the Topic-Off threshold, then the method returns to the program being executed.

Referring back to FIG. 2, when a word is not definitively recognized in any general or topic library, step 230 is performed, in which a determination is made as to which library includes a word with the highest correlation to the spoken word. As explained previously, and as will be explained in more detail in conjunction with FIG. 8, correlation values are stored for the closest matching word in each of the general library, active topic libraries, quick lists, and inactive topic libraries, assuming all of those libraries are searched. Based on the stored correlations, step 230 determines which word, and thus which library, is the closest match to the spoken word, even though the spoken word was not definitively recognized in any of the libraries.

After step 230, the method performs process D (step 232) in FIG. 2. Process D essentially modifies topic library scores, and activates and deactivates topic libraries based on which library includes the word that most closely matches the spoken word.

Figure 6:
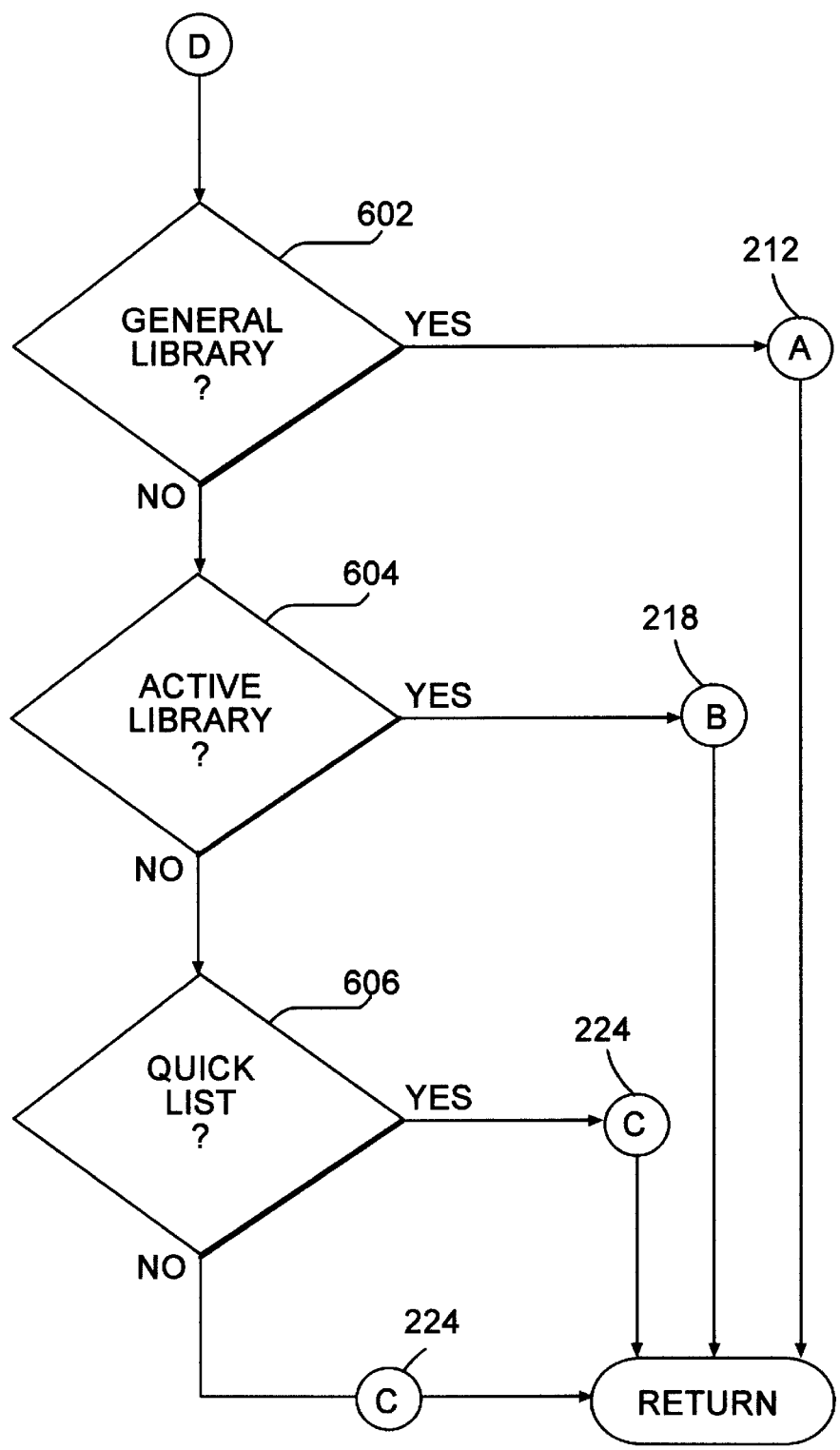
FIG. 6 illustrates a flowchart of a method for controlling dictation based on a spoken word's correlation with words in various types of libraries in accordance with a preferred embodiment of the present invention.

FIG. 6 illustrates process D, showing a flowchart of a method for controlling dictation based on a spoken word's correlation with words in various types of libraries in accordance with a preferred embodiment of the present invention. The method begins, in step 602, by determining whether the closest matching word occurs in the general library. This determination is made by comparing the correlation values stored during the library search steps of FIG. 2, and determining whether the general library has the highest of the stored correlation values. Storage of the correlation values is described in more detail in conjunction with FIG. 8.

If the closest matching word does occur in the general library, then the method performs process A, which is described in conjunction with FIG. 3. If the closest matching word does not occur in the general library, then a determination is made, in step 604, whether the closest matching word occurs in an active topic library. If so, then the method performs process B, which was described in conjunction with FIG. 4.

If the closest matching word does not occur in an active topic library, then a determination is made, in step 606, whether the closest matching word occurs in a quick list. If so, then the method performs process C, which was described in conjunction with FIG. 5. If not, then it is assumed that the closest matching word occurs in an inactive topic library, and the method performs process C. After performing step A, B, or C, the method returns to execute step 234 of FIG. 2.

Referring again to FIG. 2, after a word is dictated in step 234, a determination is made in step 236, as explained previously, whether the user has made a correction to a dictated word. A user correction could be made in real time as the user is speaking, or could be made offline after the dictation session is completed. Either way, if a user has made a correction to a word, the method performs process E (step 238) in FIG. 2. Essentially, process E involves determining in which library the new, corrected word is found. After the library is determined, the process essentially modifies topic library scores, and activates and deactivates topic libraries based on which library includes the word that most closely matches the new, corrected word.

Figure 7:
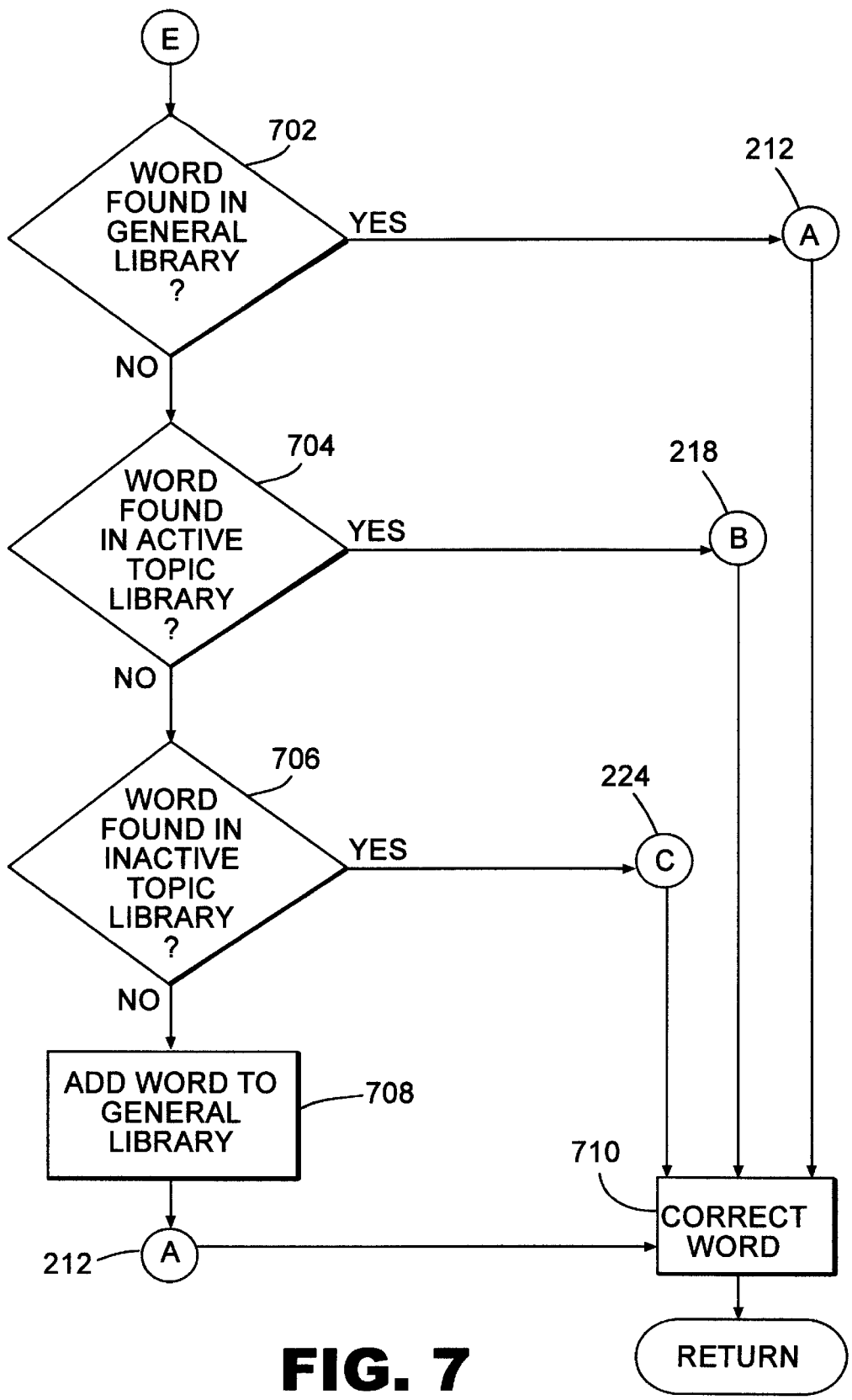
FIG. 7 illustrates a flowchart of a method for controlling dictation after a user has corrected a dictated word in accordance with a preferred embodiment of the present invention.

FIG. 7 illustrates process E, showing a flowchart of a method for controlling dictation after a user has corrected a dictated word in accordance with a preferred embodiment of the present invention. The method begins, in step 702, by determining whether the new, corrected word is found in the general library. Typically the new, corrected word is in a text format. Thus, the determination could be made, for example, by comparing the new, corrected word with the textual representations of the words in the general library. If the new, corrected word matches a word in the general library, then the method performs process A, which is described in detail in conjunction with FIG. 3.

If the new, corrected word does not match any word in the general library, then a determination is made, in step 704, whether the new, corrected word matches any word in an active topic library. If so, then the method performs process B, which is described in detail in conjunction with FIG. 4.

If the new, corrected word does not match any word in an active topic library, then a determination is made, in step 706, whether the new, corrected word matches any word in an inactive topic library. This step could involve first determining whether the new, corrected word matches a word in a quick list. In any event, if the new, corrected word does match a word in an inactive topic library, then the method performs process C, which is described in detail in conjunction with FIG. 5.

If the new, corrected word does not match a word in an inactive topic library, then the new, corrected word is added to the general library in step 708. Desirably, the system maintains a record of which words were added to the general library. The method then performs process A. In an alternate embodiment, the method could add the new, corrected word to some other library or to another database dedicated to user-provided words.

After performance of process A, B or C, the word is corrected in the displayed text and the corresponding dictated file in step 710, and the process returns to perform step 206 of FIG. 2.

Referring again to FIG. 2, determinations of whether a word is recognized are made at several points in the program flow. Specifically, steps 210, 216, 222, and 228 make such determinations. Essentially, a spoken word is considered to be recognized if a correlation between the spoken word and a word in a particular library exceeds a certain recognition threshold. If the correlation does not exceed the threshold, then the spoken word is not considered to be recognized. At times, several words within a particular library may have correlations with the spoken word that exceed the threshold. In such instances, the "closest match" is considered to be the word having the highest correlation with the spoken word.

Figure 8:
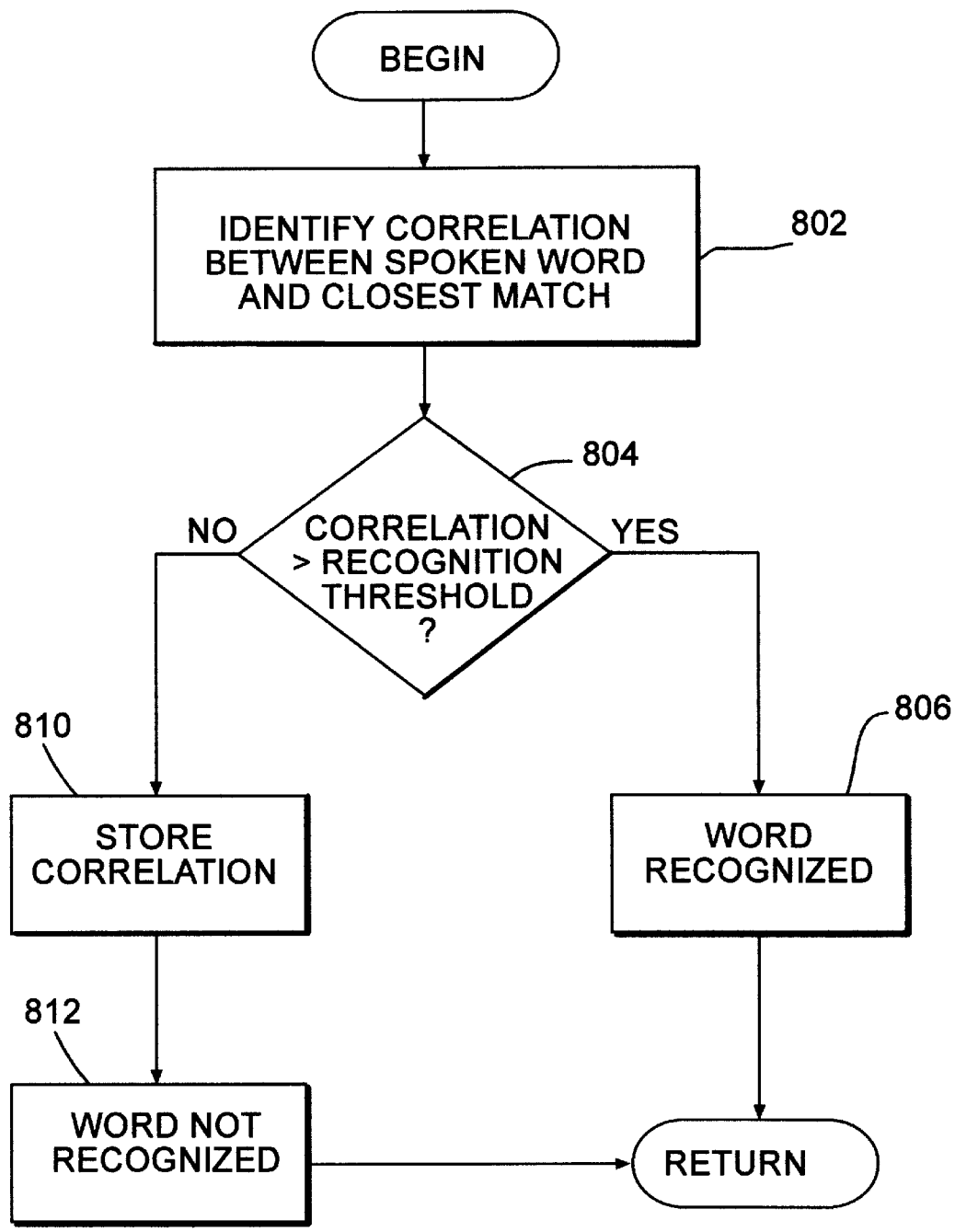
FIG. 8 illustrates a flowchart of a method for determining whether a word is recognized in accordance with a preferred embodiment of the present invention.

FIG. 8 illustrates a flowchart of a method for determining whether a word is recognized in accordance with a preferred embodiment of the present invention. The method begins, in step 802, by identifying the correlation between the spoken word and the word, in the library, that represents the closest match to the spoken word. Some or all correlations between the spoken word and each word in the library would have been stored during the library search steps (e.g., steps 208, 214, 220, and 226). Step 802 identifies the highest of the stored correlations, which would be associated with the closest match to the spoken word.

In step 804, a determination is made whether the closest match correlation is greater than a pre-defined or programmatically-determined recognition threshold. The recognition threshold is a value used to determine whether a spoken word is definitively recognized. A correlation above the recognition threshold indicates that the library word sufficiently matches the spoken word. Thus, if the correlation is above the recognition threshold, the spoken word is determined to be definitively recognized, in step 806, as the library word corresponding to the correlation.

A correlation below the recognition threshold indicates that the library word does not sufficiently match the spoken word. Thus, if the correlation is below the recognition threshold, the spoken word is not determined to be recognized. In that case, the correlation is stored, in step 810, for later use by step 230 of FIG. 2.

After storing the correlation, then the spoken word is determined not to be definitively recognized, in step 812. After the determination of whether the word is recognized or not, the method returns to the program flow of FIG. 2.

FIGS. 2–8 illustrated the method of the present invention as a sequential series of steps. Particularly, in FIG. 2, the general library, active topic libraries, quick lists, and inactive topic libraries were searched in a sequential manner. In various alternate embodiments, many of the steps illustrated in FIGS. 2–8, including the library search steps, could be performed in parallel. For example, two or more of the libraries could be searched in parallel. Also, as the method is performing the searching steps for a particular spoken word, input speech for the next spoken word could be being received, and/or post processing for a previous spoken word could also be being performed. The method illustrated in FIG. 9 is intended to show one of many possible parallel processing embodiments.

Figure 9:
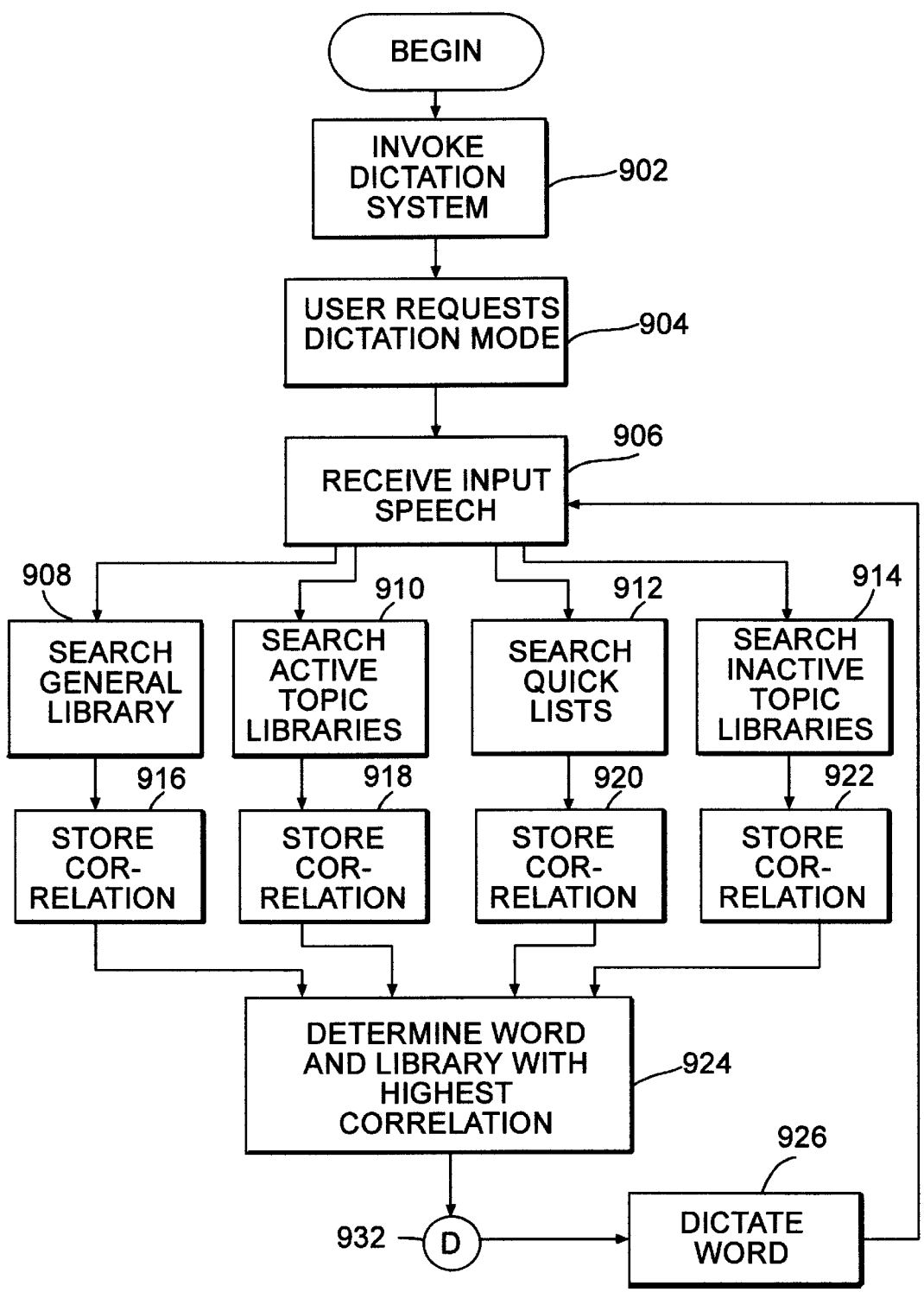
FIG. 9 illustrates a flowchart of a method for dictating speech using auxiliary topic libraries in accordance with an alternate embodiment of the present invention.

FIG. 9 illustrates a flowchart of a method for dictating speech using auxiliary topic libraries in accordance with an alternate embodiment of the present invention. The method begins, in step 902, by invoking the dictation system, after which a user requests the dictation mode in step 904. Input speech is then received in step 906. These steps are analogous to steps 202, 204, and 206, respectively, of FIG. 2.

The various libraries and quick lists are then searched in parallel. Specifically, the general library is searched in step 908, the active topic libraries are searched in step 910, the quick lists are searched in step 912, and the inactive topic libraries are searched in step 914, all in parallel with one another. These searching steps are analogous to steps 208, 214, 220, and 226, respectively, of FIG. 2.

The correlations for the closest matching words within each library are then stored in steps 916, 918, 920, and 922. These stored correlations are then reviewed, in step 924, to determine which correlation is the highest, and thus to determine the word and library having the closest matching word to the spoken word.

Once the library having the closest matching word is determined, process D is executed in step 232, as explained previously in conjunction with FIG. 6. Essentially, process D (in conjunction with processes A, B, and C) affect the score adjustment, activation, and deactivation of the various topic libraries.

The closest matching word is then dictated, in step 926, as explained previously in conjunction with step 234 of FIG. 2. The method then iterates as shown in FIG. 9.

The use of parallel processing techniques is advantageous in that it can greatly speed the process for searching libraries and dictating. Parallel processing could be used to the maximum extent possible to achieve the most efficiently running process. In devices that are not fully capable of performing parallel processing, the process could be run in a more sequential fashion.

As indicated previously, it is desirable to enable the user to specify certain system settings or parameters. For example, the user may want to rank the various available topic libraries to cause certain libraries to be searched before others. In addition, the user may want to adjust the speech recognition thresholds for each of the various libraries. In a preferred embodiment, the user is given the ability to specify certain system settings or parameters by entering into a setup mode prior to or during dictation.

Figure 10:
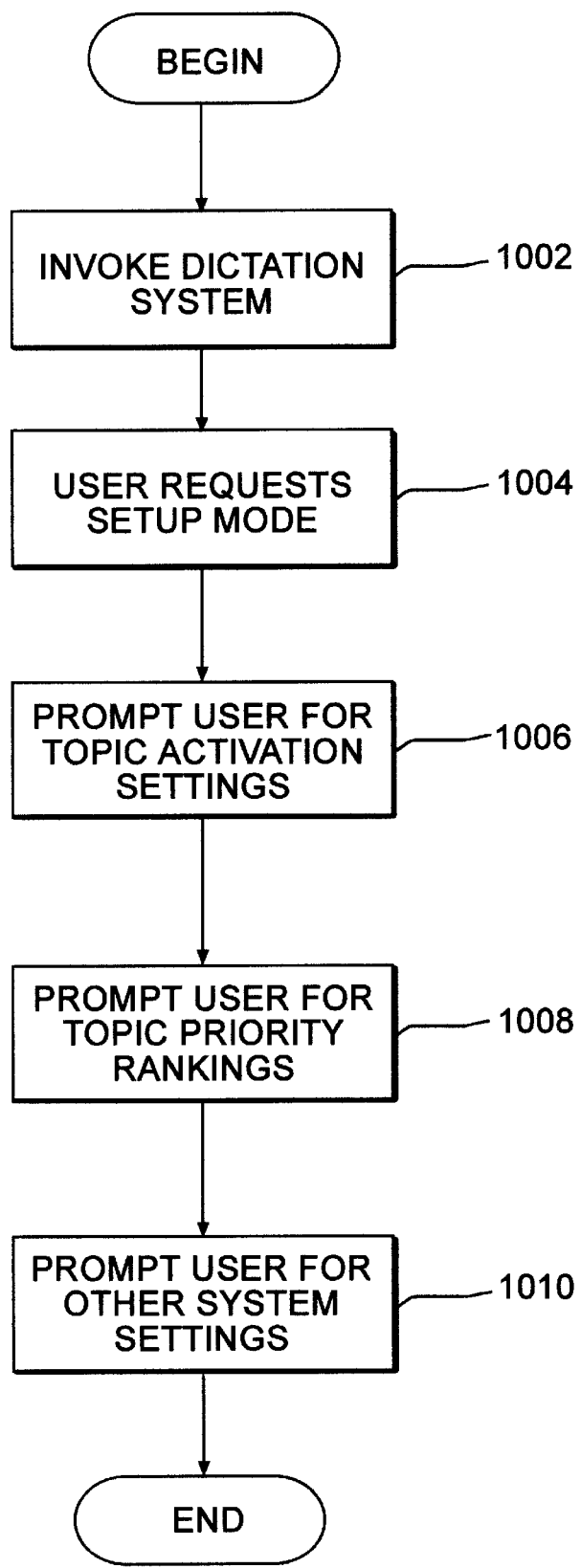
FIG. 10 illustrates a flowchart of a method for setting up a speech dictation system in accordance with a preferred embodiment of the present invention.

FIG. 10 illustrates a flowchart of a method for setting up a speech dictation system in accordance with a preferred embodiment of the present invention. The method begins, in step 1002, when the user invokes the dictation system. As explained previously, the user is then able to choose between various modes of operation. For example, the user could choose between a dictation mode or a setup mode. To enter the setup mode, the user requests the setup mode option in step 1004.

Upon entry into the setup mode, the system prompts the user for topic activation settings in step 1006. In a preferred embodiment, topic activation settings could include: the Topic On and Topic Off threshold values for each library; the recognition threshold value for each library; and whether particular libraries will always be active or inactive (thus not affected by the automatic activation and deactivation process). Desirably, the user would be given the ability to modify all settings that affect topic activation and deactivation.

Next, the system prompts the user to input topic priority rankings for the various topic libraries in step 1008. For example, if a user is interested in dictating documents relating to cooking, but is not interested in fishing, then the user could give cooking a high priority ranking, and give fishing a low priority ranking. During operation, the system would search the topic library with the highest priority first, and the libraries with the lower priorities after. In addition, the priority rankings could be used to break "ties" when the closest matching word correlations in the searched libraries are equal or very close.

In step 1010, the system prompts the user for other system settings, such as, for example, parameters associated with the screen displays (e.g., display size and font), the degree of parallel processing used, file storage options, and other settings. After the user has had the opportunity to set up the various dictation features, the method ends.

Although the setup method of FIG. 10 is described in terms of the method "prompting" the user to input certain information, such prompts are not essential. Alternatively, the ability to change various parameters and settings could be provided through pop-up or drop-down menus that the user could access at will.

As described above in conjunction with FIGS. 3–5, topic libraries are automatically activated and deactivated during the dictation process. This provides the advantage that no conscious user action is necessary to activate or deactivate a topic library, making the system very efficient, accurate, and easy to use. Also in a preferred embodiment, however, the user would also be given the ability to activate and deactivate topic libraries through conscious actions on the user's part. For example, the user would be able to activate a library by invoking certain software functions via a toolbar associated with the software.

A method and apparatus for dictating speech using automatically activated and deactivated topic libraries have been described which overcome specific problems, and accomplish certain advantages relative to prior art methods and mechanisms. The foregoing descriptions of the specific embodiments will so fully reveal the general nature of the invention that others can, by applying current knowledge, readily modify and/or adapt the embodiments for various applications without departing from the generic concept. Therefore, such adaptations and modifications should, and are intended to be comprehended within the meaning and range of equivalents of the disclosed embodiments. In particular, those skilled in the art will appreciate that the flowcharts presented herein are intended to teach the present invention and that different techniques for implementing program flow that do not necessarily lend themselves to flowcharting may be devised. For example, each task discussed herein may be interrupted to permit program flow to perform background or other tasks. In addition, the specific order of tasks may be changed, and the specific techniques used to implement the tasks may differ from system to system. In addition, where several steps base the logical flow of the method on whether a particular value is "less than" another value, other logic could be used to accomplish the same result, as would be obvious to one of skill in the art based on the description herein.

It is to be understood that the phraseology or terminology employed herein is for the purpose of description, and not of limitation. Accordingly, the invention is intended to embrace all such alternatives, modifications, equivalents, and variations as fall within the spirit and broad scope of the appended claims.

We claim:

1. A method for dictating speech using a general library and at least one auxiliary topic library, the method comprising the steps of:
   a) receiving a spoken word of input speech;
   b) comparing the spoken word to words within one or more active auxiliary topic libraries;
   c) if the spoken word is recognized as being one of the words, dictating the spoken word to be the one of the words and returning to the step of receiving;
   d) comparing the spoken word to other words within an inactive auxiliary topic library;
   e) if the spoken word is recognized as being one of the other words, automatically activating the inactive auxiliary topic library to be an active auxiliary topic library, dictating the spoken word to be the one of the other words, and returning to the step of receiving;
   f) determining whether an active auxiliary topic library should be deactivated; and
   g) if the active auxiliary topic library should be deactivated, automatically deactivating the active auxiliary topic library.

2. A method for dictating speech using a general library and at least one auxiliary topic library, the method comprising the steps of:
   a) receiving a spoken word of input speech;
   b) comparing the spoken word to words within one or more active auxiliary topic libraries;
      b1) comparing the spoken word to words within a general library;
      b2) when word Is In the general library, adjusting scores of other active auxiliary topic libraries;
      b3) determining, based on the scores, If any of the other active auxiliary topic libraries should be deactivated;
      b4) If any of the other active auxiliary topic libraries should be deactivated, automatically deactivating those of the other active auxiliary topic libraries that should be deactivated;
   c) If the spoken word is recognized as being one of the words, dictating the spoken word to be the one of the words and returning to the step of receiving;
   d) comparing the spoken word to other words within an inactive auxiliary topic library: and,
   e) if the spoken word is recognized as being one of the other words, automatically activating the inactive auxiliary topic library to be an active auxiliary topic library, dictating the spoken word to be the one of the other words, and returning to the step of receiving.

3. The method as claimed in claim 2, wherein the step of adjusting the scores comprises the step of decreasing the scores.

4. The method as claimed in claim 2, wherein the step of determining if any of the other active libraries should be deactivated comprises the steps of:
   b3a) comparing the scores for the other active libraries to a threshold; and
   b3b) if any of the scores is below the threshold, determining that the other active libraries associated with the scores below the threshold should be deactivated.

5. A method for dictating speech using a general library and at least one auxiliary topic library, the method comprising the steps of:
   a) receiving a spoken word of Input speech;
   b) comparing the spoken word to words within one or more active auxiliary topic libraries;
      b1) comparing the spoken word to words within a general library;
      b2) comparing the spoken word to words within one or more active auxiliary topic libraries;
      b3) when the spoken word is recognized in an auxiliary topic library of the one or more active auxiliary topic libraries, adjusting scores of the one or more active auxiliary topic libraries;
      b4) determining if any of the one or more active auxiliary topic libraries should be deactivated;
      b5) if any of the one or more active auxiliary topic libraries should be deactivated, automatically deactivating those of the one or more active auxiliary topic libraries that should be deactivated;
   c) if the spoken word is recognized as being one of the words, dictating the spoken word to be the one of the words and returning to the step of receiving;
   d) comparing the spoken word to other words within an inactive auxiliary topic library; and,
   e) if the spoken word is recognized as being one of the other words, automatically activating the inactive auxiliary topic library to be an active auxiliary topic library, dictating the spoken word to be the one of the other words, and returning to the step of receiving.

6. The method as claimed in claim 5, wherein the step of adjusting the scores comprises the steps of:
   b3a) increasing a score of the topic library in which the spoken word is recognized; and
   b3b) decreasing scores of the one or more active topic libraries in which the spoken word is not recognized.

7. The method as claimed in claim 5, wherein the step of determining if any of the one or more active topic libraries should be deactivated comprises the steps of:
   b4a) comparing scores for each of the one or more active topic libraries to a threshold; and
   b4b) if any of the scores is below the threshold, determining that the active topic libraries associated with the scores below the threshold should be deactivated.

8. A method for dictating speech using a general library and at least one auxiliary topic library, the method comprising the steps of:
   a) receiving a spoken word of Input speech;
   b) comparing the spoken word to words within one or more active auxiliary topic libraries;
   c) If the spoken word is recognized as being one of the words, dictating the spoken word to be the one of the words and returning to the step of receiving;
   d) comparing the spoken word to other words within an Inactive auxiliary topic library;
   e) if the spoken word is recognized as being one of the other words, automatically activating the inactive auxiliary topic library to be an active auxiliary topic library, dictating the spoken word to be the one of the other words, and returning to the step of receiving;
   f) when the spoken word is recognized as a word In the inactive auxiliary topic library, setting a score associated with the inactive auxiliary topic library to a particular value;
   g) adjusting scores of other active auxiliary topic libraries of the one or more active auxiliary topic libraries:
   h) determining if any of the other active auxiliary topic libraries should be deactivated; and
   i) if any of the other active auxiliary topic libraries should be deactivated, automatically deactivating those of the other active auxiliary topic libraries that should be deactivated.

9. The method as claimed in claim 8, wherein the step of determining if any of the other active topic libraries should be deactivated comprises the steps of:
   h1) comparing the scores of each of the other active topic libraries to a threshold; and
   h2) if any of the scores is below the threshold, determining that the other active topic libraries associated with the scores below the threshold should be deactivated.

10. A method for dictating speech using a general library and at least one auxiliary topic library, the method comprising the steps of:
    a) receiving a spoken word of input speech;
    b) comparing the spoken word to words within one or more active auxiliary topic libraries;
    c) if the spoken word is recognized as being one of the words, dictating the spoken word to be the one of the words and returning to the step of receiving;
    d) comparing the spoken word to other words within an inactive auxiliary topic library;
    e) if the spoken word is recognized as being one of the other words, automatically activating the inactive auxiliary topic library to be an active auxiliary topic library, dictating the spoken word to be the one of the other words, and returning to the step of receiving;
    f) determining whether a word that has been dictated has been corrected to another word; and
    g) if the word that has been dictated has been corrected, determining a library in which the another word exists.

11. The method as claimed in claim 10, further comprising the step of:
    h) if the another word exists in a particular inactive library, automatically activating the particular inactive library.

12. The method as claimed in claim 10, further comprising the steps of:
    h) adjusting scores of active topic libraries in which the another word does not exist;
    i) determining if any of the active topic libraries should be deactivated; and
    j) if any of the active topic libraries should be deactivated, automatically deactivating those of the active topic libraries that should be deactivated.

13. An apparatus for dictating speech using a general library and at least one auxiliary topic library comprising;
    a microphone that receives input speech;
    an analog to digital converter, coupled to the microphone, that converts the input speech Into digital speech samples;
    a processor that receives a block of the digital speech samples which represents a spoken word, compares the spoken word to words within one or more active auxiliary topic libraries, compares the spoken word to other words within an inactive auxiliary topic library, and if the spoken word is recognized as being one of the other words, automatically activates the inactive auxiliary topic library to be an active auxiliary topic library, and dictates the spoken word to be the one of the other words; and
    a memory device, coupled to the processor, for storing the one or more active auxiliary topic libraries and the inactive auxiliary topic library.

14. A machine readable storage, having stored thereon a computer program having a plurality of code sections executable by a machine for causing the machine to perform the steps of:
    a) receiving a spoken word of input speech;
    b) comparing the spoken word to words within one or more active auxiliary topic libraries where auxiliary topic libraries are in addition of a general library;
    c) if the spoken word is recognized as being one of the words, dictating the spoken word to be the one of the words and returning to the step of receiving;
    d) comparing the spoken word to other words within an inactive auxiliary topic library; and
    e) if the spoken word is recognized as being one of the other words, automatically activating the inactive auxiliary topic library to be an active auxiliary topic library, dictating the spoken word to be the one of the other words, and returning to the step of receiving.

15. A method for dictating speech using a general library and at least one auxiliary topic library, the method comprising the steps of:
    a) receiving a spoken word of input speech;
    b) comparing the spoken word to words within one or more active auxiliary topic libraries;
    c) if the spoken word is recognized as being one of the words, dictating the spoken word to be the one of the words and returning to the step of receiving;

d) comparing the spoken word to other words within an inactive auxiliary topic library; and, e) if the spoken word is recognized as being one of the other words, automatically activating the inactive auxiliary topic library, dictating the spoken word to be the one of the other words, and returning to the step of receiving.

16. The method as claimed in claim 15, further comprising:

f) determining whether an active auxiliary topic library should be deactivated; and g) if the active auxiliary topic library should be deactivated, automatically deactivating the active auxiliary topic library.

17. The method as claimed in claim 15 wherein the step of comparing the spoken word to words within one or more active libraries includes the step of:

b1) comparing the spoken word to words within a general library.

18. The method as claimed in claim 17, wherein the step of comparing the spoken word to words within one or more active libraries further comprises the step of:

b2) comparing the spoken word to words within one or more active topic libraries.

19. The method as claimed in claim 18, further comprising the steps of:

b3) when the spoken word is recognized in a topic library of the one or more active topic libraries, adjusting scores of the one or more active topic libraries;

b4) determining if any of the one or more active topic libraries should be deactivated; and b5) if any of the one or more active topic libraries should be deactivated, automatically deactivating those of the one or more active topic libraries that should be deactivated.

20. The method as claimed in claim 19, wherein the step of adjusting the scores comprises the steps of:

b3a) increasing a score of the topic library in which the spoken word is recognized; and b3b) decreasing scores of the one or more active topic libraries in which the spoken word is not recognized.

21. The method as claimed in claim 19, wherein the step of determining if any of the one or more active topic libraries should be deactivated comprises the steps of:

b4a) comparing scores for each of the one or more active topic libraries to a threshold; and b4b) if any of the scores is below the threshold, determining that the active topic libraries associated with the scores below the threshold should be deactivated.

22. The method as claimed in claim 3, further comprising the steps of:

b2) when the spoken word is in the general library, adjusting scores of other active auxiliary topic libraries;

b3) determining, based on the scores, if any of the other active auxiliary topic libraries should be deactivated; and, b4) if any of the other active auxiliary topic libraries should be deactivated, automatically deactivating those of the other active auxiliary topic libraries that should be deactivated.

23. The method as claimed in claim 22, wherein the step of adjusting the scores comprises the step of decreasing the scores.

24. The method as claimed in claim 22, wherein the step of determining if any of the other active auxiliary topic libraries should be deactivated comprises the steps of:

b3a) comparing the scores for the other active auxiliary topic libraries to a threshold; and b3b) if any of the scores is below the threshold, determining that the other active auxiliary topic libraries associated with the scores below the threshold should be deactivated.

25. The method as claimed in claim 15, wherein the step of comparing the spoken word to other words within an inactive topic library comprises the steps of:

d1) comparing the spoken word to words within a quick list which includes a subset of words from the inactive topic library; and d2) if the spoken word is recognized as being one of the words within the quick list, automatically activating the inactive topic library associated with the quick list.

26. The method as claimed in claim 15, wherein the step of comparing the spoken word to words within one or more active libraries comprises the step of:

b1) determining correlations between the spoken word and active library words; and b2) determining correlations between the spoken word and inactive library words.

27. The method as claimed in claim 26, further comprising the step of:

f) if one or more of the correlations is greater than a recognition threshold, determining that the spoken word is recognized; and g) if none of the correlations are greater than the recognition threshold, determining that the spoken word is not recognized.

28. The method as claimed in claim 26, further comprising the steps of:

h) storing correlations associated with closest matching words within each of the one or more active libraries and the inactive library; and i) if the spoken word is not recognized in the one or more active libraries or the inactive library, determining a word and a library with a highest correlation, and dictating the word with the highest correlation.

29. The method as claimed in claim 15, further comprising the steps of:

f) when the spoken word is recognized as a word in the inactive topic library, setting a score associated with the inactive topic library to a particular value;

g) adjusting scores of other active topic libraries of the one or more active libraries;

h) determining if any of the other active topic libraries should be deactivated;

and i) if any of the other active topic libraries should be deactivated, automatically deactivating those of the other active topic libraries that should be deactivated.

30. The method as claimed in claim 29, wherein the step of determining if any of the other active topic libraries should be deactivated comprises the steps of:

h1) comparing the scores of each of the other active topic libraries to a threshold; and h2) if any of the scores is below the threshold, determining that the other active topic libraries associated with the scores below the threshold should be deactivated.

31. The method as claimed in claim 15, further comprising the steps of:

f) determining whether a word that has been dictated has been corrected to another word; and g) if the word that has been dictated has been corrected, determining a library in which the another word exists.

32. The method as claimed in claim 31, further comprising the step of:

h) if the another word exists in a particular inactive library, automatically activating the particular inactive library.

33. The method as claimed in claim 31, further comprising the steps of:

h) adjusting scores of active topic libraries in which the another word does not exist;

i) determining if any of the active topic libraries should be deactivated; and j) if any of the active topic libraries should be deactivated, automatically deactivating those of the active topic libraries that should be deactivated.

\* \* \* \* \*